United States Patent
Kokubu et al.

(10) Patent No.: US 8,220,324 B2
(45) Date of Patent: Jul. 17, 2012

(54) TIRE CHECKING DEVICE, TIRE CHECKING SYSTEM AND TIRE CHECKING METHOD

(75) Inventors: Takao Kokubu, Akishima (JP); Hiromasa Hada, Kokubunji (JP); Shigeru Yamaguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 972 days.

(21) Appl. No.: 12/160,559

(22) PCT Filed: Dec. 28, 2006

(86) PCT No.: PCT/JP2006/326287
§ 371 (c)(1),
(2), (4) Date: Sep. 18, 2008

(87) PCT Pub. No.: WO2007/080807
PCT Pub. Date: Jul. 19, 2007

(65) Prior Publication Data
US 2009/0031795 A1 Feb. 5, 2009

(30) Foreign Application Priority Data
Jan. 10, 2006 (JP) ................. P2006-002760

(51) Int. Cl.
*B60C 23/02* (2006.01)
(52) U.S. Cl. ............... 73/146.5; 73/146; 340/442
(58) Field of Classification Search .......... None
See application file for complete search history.

(56) References Cited

U.S. PATENT DOCUMENTS
6,036,179 A 3/2000 Rensel
(Continued)

FOREIGN PATENT DOCUMENTS
JP 59-195514 A 12/1984
(Continued)

OTHER PUBLICATIONS
Supplementary European Search Report dated Feb. 25, 2010 (4 pages).

*Primary Examiner* — Lisa Caputo
*Assistant Examiner* — Jermaine Jenkins
(74) *Attorney, Agent, or Firm* — Sughrue Mion, PLLC

(57) ABSTRACT

Identification information for identifying a tire, a tire inner pressure and a tire inner temperature are sent to a tire checking device from a first electronic device provided within a tire and measured results are shown on a display. Groove depth data from a depth meter are also received by the tire checking device and shown on the display. The tire checking device stores received management information such as a tire inner pressure, a tire inner temperature, a groove depth and so on in a memory with associating them with each tire. The stored management information is extracted by a control unit if required and shown on the display. Therefore, a tire inner pressure and a tire inner temperature are detected automatically and groove depth data are stored with being associated with each tire, and thereby the tire inner pressure, the tire inner temperature and the groove depth data can be displayed.

13 Claims, 9 Drawing Sheets

U.S. PATENT DOCUMENTS

| | | |
|---|---|---|
| 6,243,007 B1 | 6/2001 | McLaughlin et al. |
| 6,414,592 B1 * | 7/2002 | Dixit et al. .................... 340/447 |
| 6,634,223 B2 * | 10/2003 | Hartmann et al. ............... 73/146 |
| 6,737,965 B2 * | 5/2004 | Okubo ........................... 340/445 |
| 6,804,999 B2 * | 10/2004 | Okubo ............................. 73/146 |
| 6,825,758 B1 | 11/2004 | Laitsaari |
| 6,826,951 B1 | 12/2004 | Schuessler, Jr. et al. |
| 6,965,305 B2 * | 11/2005 | Taguchi et al. ................ 340/447 |
| 6,972,691 B2 * | 12/2005 | Okubo ..................... 340/870.07 |
| 7,015,801 B1 * | 3/2006 | Juzswik ........................ 340/442 |
| 7,253,726 B2 * | 8/2007 | Okubo ........................... 340/447 |
| 7,373,228 B2 * | 5/2008 | Taguchi et al. .................. 701/33 |
| 7,509,834 B2 * | 3/2009 | Bauchot et al. ..................... 73/8 |
| 7,578,180 B2 * | 8/2009 | Lionetti et al. .................. 73/146 |
| 2004/0206167 A1 | 10/2004 | Pacsai et al. |
| 2004/0225423 A1 * | 11/2004 | Carlson et al. .................. 701/36 |

FOREIGN PATENT DOCUMENTS

| | | |
|---|---|---|
| JP | 10-324120 A | 12/1998 |
| JP | 11-235910 A | 8/1999 |
| JP | 11-310020 A | 11/1999 |
| JP | 2001-191768 A | 7/2001 |
| JP | 2002-131191 A | 5/2002 |
| JP | 2002-216281 A | 8/2002 |
| JP | 2004-082814 A | 3/2004 |
| JP | 2004-322828 A | 11/2004 |

* cited by examiner

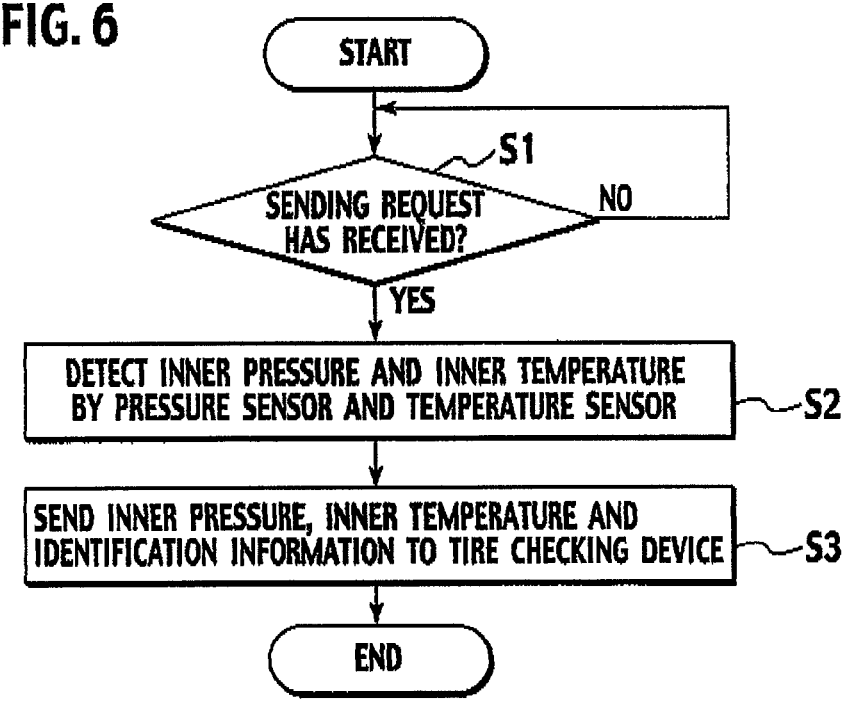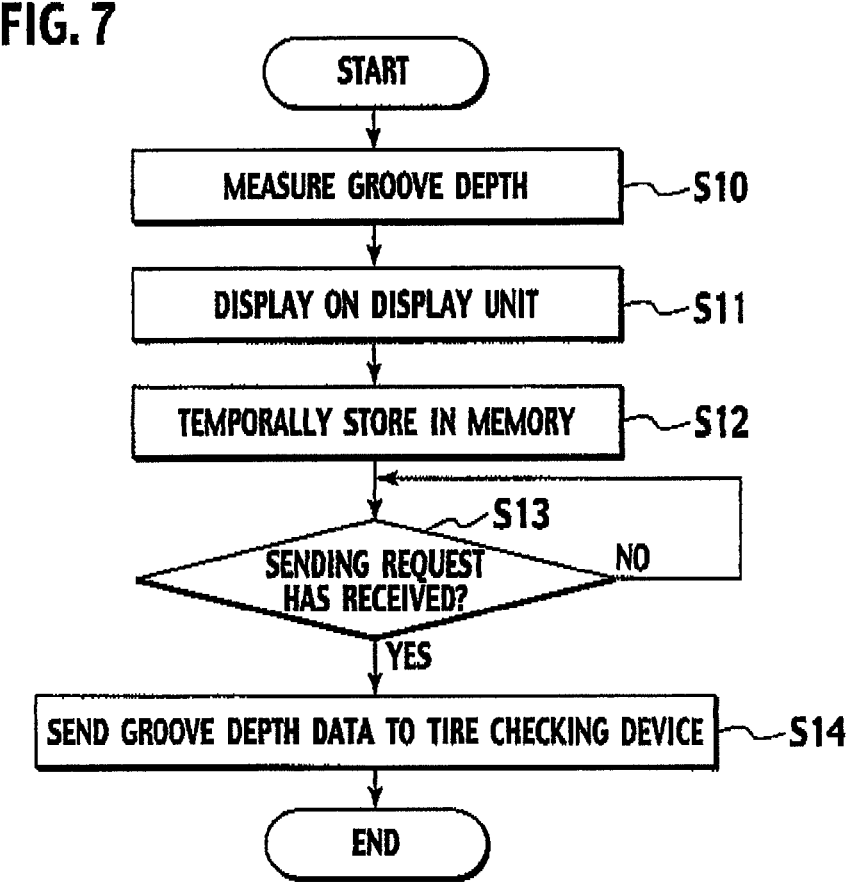

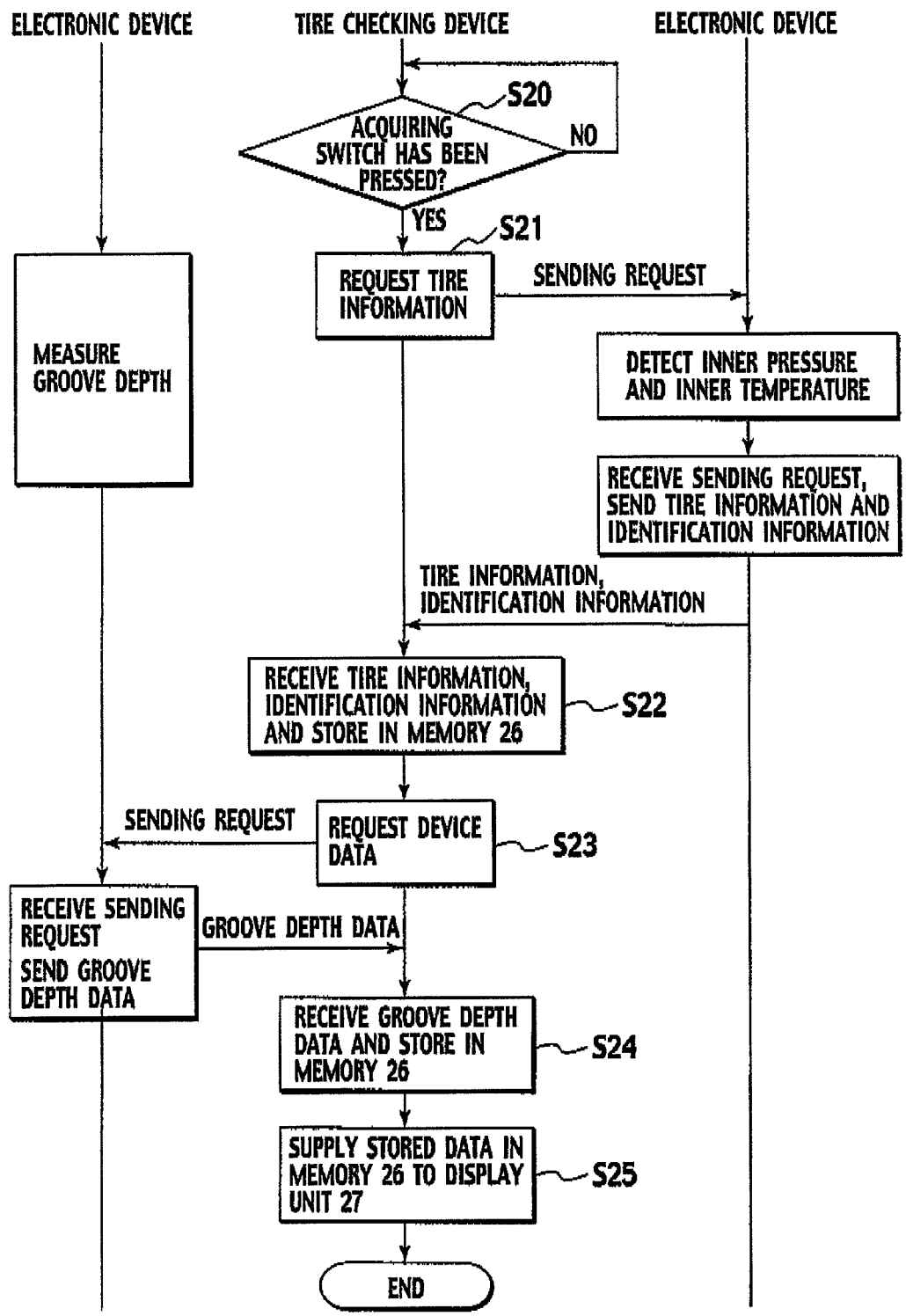

| TIRE IDENTIFICATION INFORMATION | TIRE INNER PRESSURE | TIRE TEMPERATURE | GROOVE DEPTH |
|---|---|---|---|
| A-1 | 900kPa | 20°C | 1.5mm |

(b)

| TIRE IDENTIFICATION INFORMATION | POSITION INFORMATION | TIRE INNER PRESSURE | TIRE TEMPERATURE | GROOVE DEPTH |
|---|---|---|---|---|
| A-1 | 1 | 900kPa | 20°C | 20.5mm |
| A-2 | 2 | 890kPa | 22°C | 18.5mm |
| ⋮ | ⋮ | ⋮ | ⋮ | ⋮ |
| A-12 | 12 | 900kPa | 21°C | 20.0mm |

(c)

| VEHICLE IDENTIFICATION INFORMATION | TIRE IDENTIFICATION INFORMATION | POSITION INFORMATION | TIRE INNER PRESSURE | TIRE TEMPERATURE | GROOVE DEPTH |
|---|---|---|---|---|---|
| X | A-1 | 1 | 900kPa | 20°C | 20.5mm |
| ⋮ | ⋮ | ⋮ | ⋮ | ⋮ | ⋮ |
| X | A-12 | 12 | 900kPa | 21°C | 20.0mm |
| Y | B-1 | 1 | 880kPa | 19°C | 19.0mm |
| ⋮ | ⋮ | ⋮ | ⋮ | ⋮ | ⋮ |
| Y | B-12 | 12 | 890kPa | 21°C | 21.5mm |
| ⋮ | ⋮ | ⋮ | ⋮ | ⋮ | ⋮ |

TIRE CHECKING DEVICE, TIRE CHECKING SYSTEM AND TIRE CHECKING METHOD

CROSS REFERENCE TO RELATED APPLICATION

This application is a National Stage of International Application No. PCT/JP2006/326287 filed on Dec. 28, 2008, claiming priority based on Japanese Patent Application No. 2006-002760, filed Jan. 10, 2006, the contents of all of which are incorporated herein by reference in their entirety.

TECHNICAL FIELD

The present invention relates to a tire checking device, a tire checking system and a tire checking method for measuring a tire inner pressure and other information on tire conditions.

BACKGROUND ART

In order to ensure safety of a tire, it is needed to focus continuously on management information indicating tire conditions such as a pressure within a tire (referred as a tire inner pressure), a groove depth of tread pattern on a tire surface, an abrasion condition of a tire. A so-called air gauge is used to measure a tire inner pressure. A depth gauge or the like is known as a measuring instrument to measure a groove depth on a tire surface. Especially, a checking device is disclosed, which includes a sensor for measuring a tire inner pressure and a detector for detecting a groove depth to display digitally the measured tire inner pressure and groove depth (for example, Patent Document 1).

In addition to the above, various proposals have been made on a tire checking system for checking a pneumatic tire. For example, disclosed is a device, into which an operator inputs a groove depth of tread pattern, a tire abrasion degree, a tire inner pressure and so on that have been judged visually by the operator and which manages such information collectively (for example, Patent Document 2). In this device, such information is provided to a user of the tire by being displayed on a screen or as a printout.

Patent Document 1: Japanese Utility Model Application Laid-Open NO. S59-195514

Patent Document 2: Japanese Patent Application Laid-Open NO. H11-310020 (pages 2-3, FIG. 1)

DISCLOSURE OF THE INVENTION

An air-filling timing based on a tire inner pressure and a tire-replacement timing based on a groove depth may differ with respect to each tire due to its installed position, its status of use and so on, even if tires are equipped on an identical vehicle body. Therefore, tire management information should be managed with respect to each tire.

However, according to the art disclosed in the above-mentioned Patent Documents, since the operator who uses the tire checking device must input each tire inner pressure and each groove depth of tires manually with being associated with each of the tires, it is concerned that an input error may occur. In addition, since cumbersome are input operations for associating each set of a tire inner pressure and a groove depth with identification information for identifying a tire, it must take much time to check the tires.

Then, an object of the present invention is, in order to solve the above-mentioned issues, to provide a tire checking device, a tire checking system and a tire checking method that can redress cumbersome checking operations of a tire condition including a tire inner pressure and a groove depth and also can manage tire condition information easily.

A tire checking device according to the present invention includes a first transmitting unit, an operation input unit, an input detecting unit, a sending requesting unit, a second transmitting unit, a data requesting unit, a display unit, and a control unit. The first transmitting unit receives tire information including a tire inner pressure of a pneumatic tire and identification information for identifying the pneumatic tire from a first electronic device provided within the tire. And the first transmitting unit sends a requesting signal for the tire information to the first electronic device. An operator conducts an input operation onto the operation input unit. The input detecting unit detects an input onto the operation input unit. The sending requesting unit requests the first electronic device for the tire information when the input operation has been detected by the input detecting unit. The second transmitting unit receives data from a second electronic device. And the second transmitting unit sends data to the second electronic device. The data requesting unit requests the second electronic device for data. The display unit displays the tire information and the data.

The control unit requests the second electronic device for data by controlling the data requesting unit when having received at least the identification information from the first electronic device via the first transmitting unit. In addition, the control unit displays the tire information and the data which have been received and associated with each other on the display unit.

In the tire checking device according to the present invention, the second electronic device is requested for data when at least the identification information has been received from the first electronic device and the tire information and the data have been received and associated with each other to be displayed. Therefore, according to the present invention, reduced can be cumbersome operations that a checker checks a tire inner pressure and then inputs it into a device. In addition, since each tire can be identified based on the identification information, management of a tire inner pressure in respect to each tire can be achieved easily.

Here, it is preferable that the second electronic device is a groove measuring device having a measuring unit for measuring a groove depth on a tread of the tire. Here, the control unit requests the groove measuring device for groove depth data by controlling the data requesting unit when having received at least the identification information from the first electronic device via the first transmitting unit to display the tire information and the groove depth data which have been received and associated with each other on the display unit.

According to this configuration, the groove measuring device is requested for the data when at least the identification information has received from the first electronic device and the tire information and the groove depth data have been received and associated with each other to be displayed. Therefore, according to the present invention, reduced can be cumbersome operations that a checker checks a tire inner pressure and a groove depth, and then inputs them into a device. In addition, since each tire can be identified based on the identification information, management of a tire inner pressure and a groove depth in respect to each tire can be achieved easily.

Here, it is preferable that the tire checking device further includes a storing unit for storing the tire information and the data. According to this configuration, since the tire information and the data (groove depth data) which have been received can be stored in respect to each tire, management of data such as a tire inner pressure and a groove depth can be achieved easily.

Here, it is further preferable that vehicle identification information for identifying a vehicle on which the tire is equipped is stored in the storing unit. According to this configuration, the vehicle identification information, the tire information and the data (groove depth data) can be stored in respect to each tire and these can be stored in respect to each vehicle on which the tire is equipped. Therefore, reduced can be cumbersome operations that a checker inputs the data into a device and then management of the data such as a tire inner pressure and a groove depth can be achieved easily.

In addition, it is preferable that the tire checking device further includes a transmitting unit for sending the tire information and the data which are associated with each other to a third electronic device. According to this configuration, the data such as a tire inner pressure and a groove depth can be sent the third electronic device such as a management terminal and then management of the data such as a tire inner pressure and a groove depth can be achieved easily.

In addition, it is preferable that the tire checking device has a portable size. According to this configuration, a checker can carry the tire checking device easily and then checking and management of the data such as a tire inner pressure and a groove depth can be achieved easily.

A tire checking system according to the present invention includes a first electronic device provided within a pneumatic tire, a tire checking device for collecting and displaying checked results, and a second electronic device. The first electronic device includes an inner pressure sensor for detecting a tire inner pressure of the pneumatic tire, and a transmitting device for sending tire information including the tire inner pressure and identification information for identifying the pneumatic tire. The tire checking device includes a first transmitting unit, an operation input unit, an input detecting unit, a sending requesting unit, a second transmitting unit, a data requesting unit, a display unit and a control unit, and collects detected results to display. The first transmitting unit receives the tire information from the transmitting device of the first electronic device. And the first transmitting unit sends a requesting signal for the tire information to the first electronic device. An operator conducts an input operation onto the operation input unit. The input detecting unit detects an input onto the operation input unit. The sending requesting unit requests the first electronic device for the tire information when the input operation has been detected by the input detecting unit. The second transmitting unit receives data from the second electronic device. And the second transmitting units ends data to the second electronic device. The data requesting unit requests the second electronic device for data. The display unit displays the tire information and the data. The control unit requests the second electronic device for data by controlling the data requesting unit when having received at least the identification information from the first electronic device via the first transmitting unit. And the control unit displays the tire information and the data which have been received and associated with each other on the display unit.

In the tire checking system according to the present invention, the second electronic device is requested for data when at least the identification information has been received from the first electronic device and the tire information and the data have been received and associated with each other to be displayed. Therefore, according to the present invention, reduced can be cumbersome operations that a checker checks a tire inner pressure and then inputs it into a device. In addition, since each tire can be identified based on the identification information, management of a tire inner pressure in respect to each tire can be achieved easily.

Here, it is preferable that the second electronic device is a groove measuring device having a measuring unit for measuring a groove depth on a tread of the tire. Here, the control unit requests the groove measuring device for groove depth data by controlling the data requesting unit when having received at least the identification information from the first electronic device via the first transmitting unit to display the tire information and the groove depth data which have been received and associated with each other on the display unit.

According to this configuration, the groove measuring device is requested for the data when at least the identification information has received from the first electronic device and the tire information and the groove depth data have been received and associated with each other to be displayed. Therefore, according to the present invention, reduced can be cumbersome operations that a checker checks a tire inner pressure and a groove depth, and then inputs them into a device. In addition, since each tire can be identified based on the identification information, management of a tire inner pressure and a groove depth in respect to each tire can be achieved easily.

Here, it is preferable that the tire checking device further includes a storing unit for storing the tire information and the data. The control unit of the tire checking device stores the tire information and the data which have been received and associated with each other in the storing unit. According to this configuration, since the tire information and the data (groove depth data) which have been received can be stored in respect to each tire, management of data such as a tire inner pressure and a groove depth can be achieved easily.

Here, it is further preferable that vehicle identification information for identifying a vehicle on which the tire is equipped is stored in the storing unit of the tire checking device. The control unit displays the vehicle identification information, the tire information and the data which are associated with each other on the display unit and stores them in the storing unit. According to this configuration, the vehicle identification information, the tire information and the data (groove depth data) can be stored in respect to each tire and these can be stored in respect to each vehicle on which the tire is equipped. Therefore, reduced can be cumbersome operations that a checker inputs the data into a device and then management of the data such as a tire inner pressure and a groove depth can be achieved easily.

In addition, it is preferable that the tire checking device further includes a transmitting unit for sending the tire information and the data which are associated with each other to a third electronic device. According to this configuration, the data such as a tire inner pressure and a groove depth can be sent the third electronic device such as a management terminal and then management of the data such as a tire inner is pressure and a groove depth can be achieved easily.

In addition, a tire checking method according to the present invention is a method for checking a pneumatic tire using information transmitting system which includes a first electronic device provided within the pneumatic tire, a second electronic device and a device for collecting data sent from the first electronic device and the second electronic device. The present invention includes; a step of receiving an input operation from an operator; an input detecting step of detecting the input operation; an information sending requesting step; a first receiving step; a data requesting step; a second receiving step; and a displaying step. In the information sending requesting step, a sending device, which sends the tire information including a tire inner pressure and identification information for identifying a tire when an input operation has been detected in the input detecting step, is requested to send tire information, the sending device. In the first receiving step, the tire information sent from the sending device is received. In the data requesting step, a second electronic device is requested to send data when at least the identification data has been received in the first receiving step. In the second receiving step, the data sent from the second electronic device is received. In the displaying step, the tire information and the data which have been associated with each other are displayed on a display unit. According to the present invention, management of the data such as a tire inner pressure and a groove depth can be achieved easily.

BRIEF DESCRIPTION OF THE DRAWINGS

FIG. 6 is a flow chart of processes executed by a first electronic device in the tire checking system.

FIG. 7 is a flow chart of processes executed by the second electronic device in the tire checking system.

FIG. 8 is a flow chart illustrating processes and timings such as collecting, displaying and storing of tire information executed by the controller of the tire checking device.

FIG. 9 is a diagram illustrating examples of data stored in a memory of the tire checking device.

BEST MODE(S) FOR CARRYING OUT THE INVENTION

Hereinafter, an example of a tire checking system including a tire checking device according to the present invention will be explained with reference to the drawings. Note that identical or similar elements are allocated with identical or similar numerals. However, since the drawings schematically illustrate the tire checking device according the present invention, proportions or the like in respect to respective dimensions may be different from actual proportions, In addition, dimensional relations or proportions may differ among the drawings. Concrete dimensions or the like should be evaluated based on explanations described below.

(Overall General Configuration of Tire Checking System)

Figure 1:
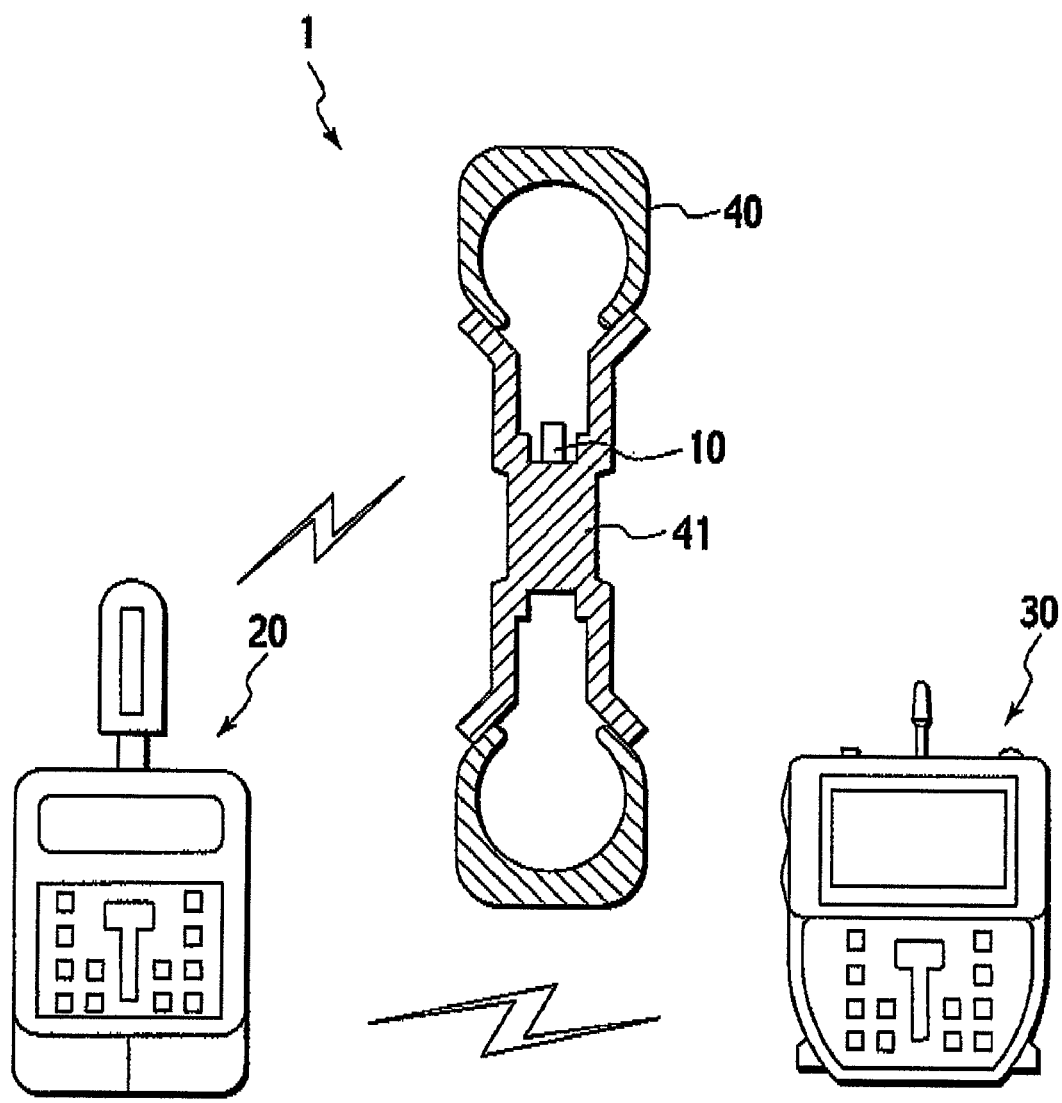
FIG. 1 is a general configuration diagram illustrating a tire checking system of an embodiment according to the present invention.
Figure 2:
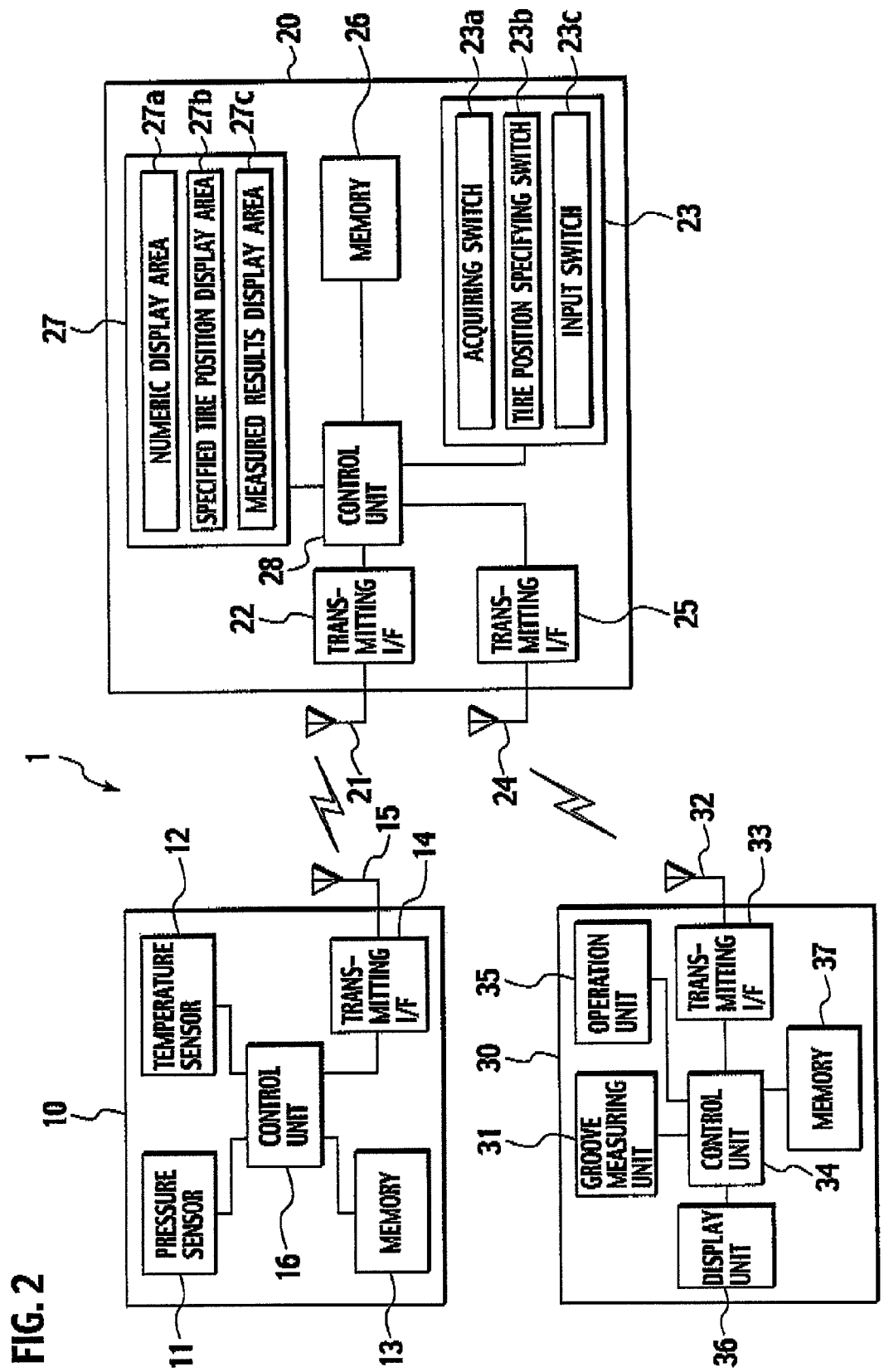
FIG. 2 is a configuration diagram illustrating an internal configuration of the tire checking system.

FIG. 1 shows a general configuration of the tire checking system 1 in an embodiment according to the present invention, and FIG. 2 shows an internal configuration of the tire checking system 1. As shown in FIG. 1, the tire checking system 1 is configured with a first electronic device 10, a tire checking device 20 and a second electronic device 30. The first electronic device 10 is provided within a pneumatic tire 40 to measure a tire inner pressure and so on. The tire checking device 20 collects various checking results in respect to the tire and displays the results. The pneumatic tire in the present embodiment is a tire to be equipped on an automobile, especially a tire to be equipped for types of vehicles (for example, buses and trucks) that needs a comprehensive safety management on a vehicle body by a business company such as a transport company or a carrier company. In addition, the second electronic device 30 is an electronic device with a measuring function of a tire condition, specifically a depth meter for measuring a depth of a groove formed on a tire tread.

The first electronic device 10 is, as shown in FIG. 1, mounted on an inner surface of a wheel 41 within a cavity segmented by the tire 40 and the wheel 41. However, attaching method of the first electronic device 10 is not limited to the above method. For example, the first electronic device 10 may be mounted on an inner surface of the tire instead of the wheel.

The first electronic device 10 includes, as shown in FIG. 2, a pressure sensor 11, a temperature sensor 2, a memory 13 and a transmitting interface (I/F) 14. The pressure sensor 11 detects a tire inner pressure. The temperature sensor 12 detects a temperature with in the tire. The memory 13 can be readable at least and is a ROM or the like storing unique identification information allocated to each device. The transmitting I/F 14 sends detected results by the sensors or the like to the tire checking device 20 via an antenna 15. Alternatively, the transmitting I/F 14 receives a sending request for the detected results by the sensors or the like from the tire checking device 20. These units are controlled collectively by a control unit 16. The first electronic device 10 is singly provided within each tire. Since the unique identification information allocated to each device is stored in the memory 13 of the first electronic device 10, each tire can be identified based on the identification information.

The first electronic device 10 detects an air pressure within the tire 40 and an internal temperature of the tire by the pressure sensor 11 and the temperature sensor 12 with being equipped with the above configuration. Then, the control unit 16 sends the identification information stored in the memory 13 for specifying the first electronic device 10 and detected results when having received the sending request for the detected results from the tire checking device 20 via the antenna 15 and the transmitting I/F 14.

Figure 3:
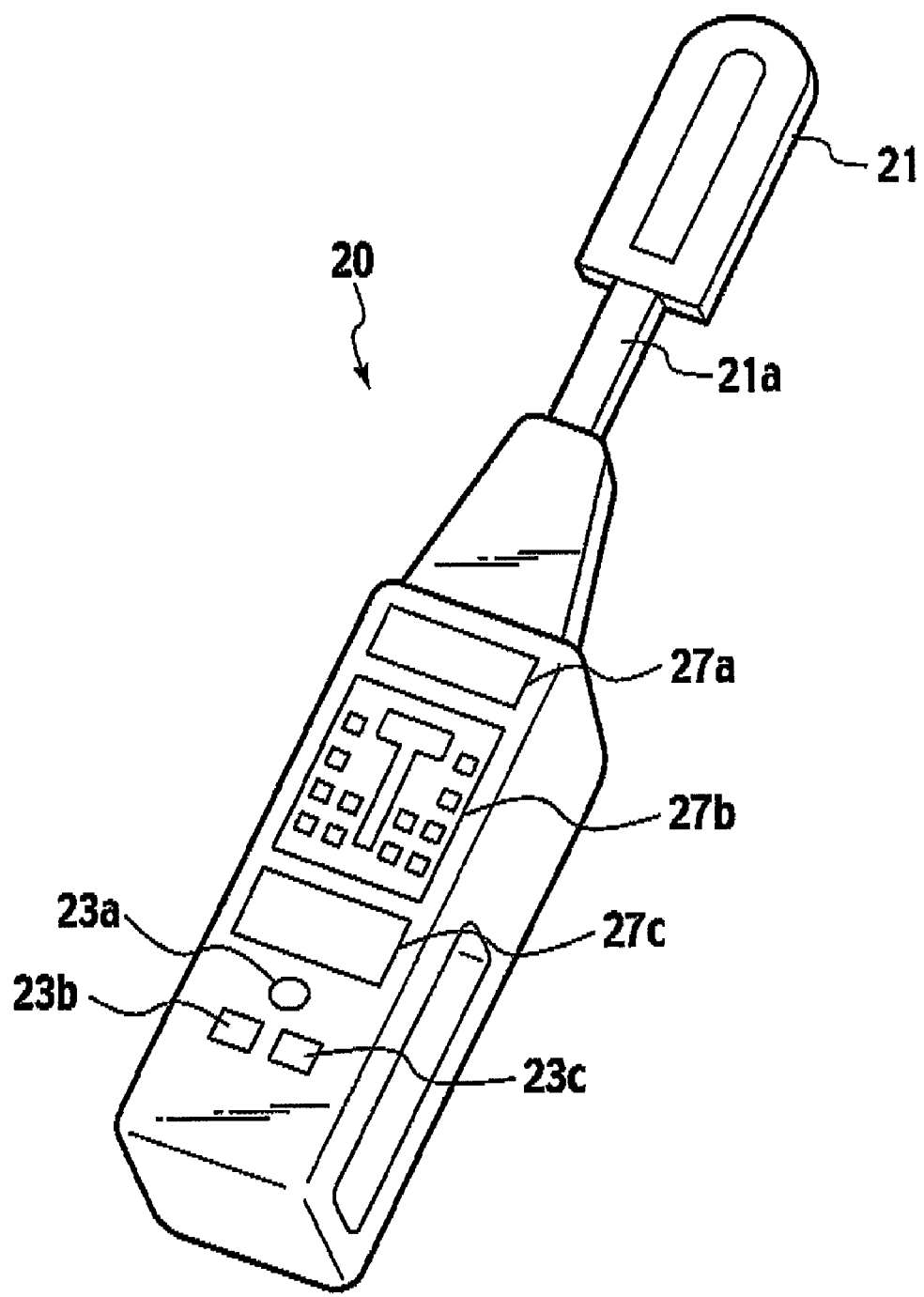
FIG. 3 is a perspective diagram illustrating a concrete example of a tire checking device in the tire checking system.

Next, the tire checking device 20 will be explained specifically. FIG. 3 shows a concrete example of an appearance of the tire checking device 20. The tire checking device 20 includes, as shown in FIGS. 2 and 3, antennas 21 and 24, transmitting I/Fs 22 and 25, an operation input unit 23, a memory 26 and a display unit 27. The transmitting I/F 22 transmits data with the first electronic device 10 via the antenna 21. Input operations are conducted by an operator on the operation input unit 23. The transmitting I/F 25 transmits data with the second electronic device 30 via the antenna 24. The memory 26 stores various kinds of information relating to the tire. Data are displayed on the display unit 27. These units are controlled collectively by a control unit 28.

Specifically, the antenna 21 is attached to a main body detachably via an antenna arm 21a or the like. The antenna 21 is, although not shown, prepared with various kinds each having different length and can be replaced if required. In addition, the antenna arm 21a may be configured telescopically.

The transmitting I/F 28 is controlled by the control unit 28 and receives the detected results by the sensors (for example, the pressure sensor 11 and the temperature sensor 12) within the first electronic device 10 and the identification information and so on. In addition, a requesting signal for tire information and soon is sent to the first electronic device 10 via the transmitting I/F 22. Here, the detected results by the pressure sensor 11 and the temperature sensor 12 provided in the first electronic device 10 and the identification information stored in the memory 13 are referred as the tire information.

The operation input unit 23 is configured with operational buttons for receiving operations by a checker who checks a tire, i.e. an operator of the tire checking device 20. As shown in FIG. 3, the operation input unit 23 includes a acquiring switch 23a for acquiring data from the first electronic device 10, a tire position specifying switch 23b for specifying a tire position, an input switch 23c for being input with instructions such as measuring modes, data transmission or the like, and so on. In addition, although not shown, the operation input unit 23 may include other switches for inputs.

The transmitting I/F 25 is an I/F for transmitting data via the antenna 24 with the second electronic device 30 which measures the tire conditions. In the present embodiment, another transmitting format is adopted other than that with the first electronic device 10.

The memory 26 stores a tire inner pressure, a tire inner temperature and various kinds of data associated with a tire measured by the second electronic device 20 together with each identification information of the first electronic device 10, in other words with being associated with each tire. In addition, vehicle identification information for identifying a vehicle on which the tire 40 is equipped or the like can be stored with being associated (for example, a serial number, a license plate number or a vehicle identification number [VIN] of the vehicle). A magnetic, optical or magnetic-optical disc recording media can be adopted as the memory 26, in addition to a RAM (Random Access Memory) which is readable and writable and composed of semiconductor elements. In addition, the memory 26 may be detachable. Data stored in the memory 26 will be explained later in detail.

The display unit 27 is a display panel for displaying a tire inner pressure, a tire temperature or the like. The display unit 27 includes a numeric display area 27a, a tire position display area 27b for displaying the specified tire position and a measured results display area 27c for displaying measured results. The numeric display area 27a can display a tire inner pressure and an inner temperature of the tire 40 and other information associated with the tire numerically. In addition, the tire position display area 27b displays the tire position to which the tire inner pressure, the inner temperature being displayed in the numeric display area 27a correspond. The measured results display area 27c displays the other information associated with the tire (other measured result and so on) with being associated with the tire inner pressure and the inner temperature being displayed in the tire position display area 27b. In the present embodiment, the measured results display area 27c can display a groove depth sent from the depth meter 30, identification information for identifying the tire 40 (for example, a serial number or a LOT number), the vehicle identification information (for example, a serial number, a license plate number or a VIN of the vehicle) and so on in addition to the tire inner pressure and the inner temperature.

In the present embodiment, the numeric display area 27a, the tire position display area 27b and the measured results display area 27c which are mentioned above are provided as separated display areas on the tire checking device 20, respectively. However, the numeric display area 27a, the tire position display area 27b and the measured results display area 27c may arranged in a unified display area. For example, a Liquid Crystal Display device, which composed of an LCD panel and a drive unit, or the like can be adopted as the display unit 27.

The control unit 28 mainly executes a data requesting process to the second electronic device 30 when having received the identification information had sent from the first electronic device 10 via the transmitting I/F22. The control unit 28 also executes a process for displaying data from the second electronic device 30 and measured results by the sensors received from the first electronic device 10 on the display unit 27. Alternatively, the control unit 28 executes a process for storing data from the second electronic device 30 and measured results by the sensors received from the first electronic device 10 in the memory 26. Configurations of the control unit 28 for executing these processes will be explained later.

The tire checking device 20 including the above-mentioned configurations sends the sending request for the identification information and the measured results by the sensors to the first electronic device 10 via the transmitting I/f 22 when it has been detected that the acquiring switch 23a of the operation input unit 23 has been pressed. The control unit 28 sends the sending request for data to the second electronic device 20 when having received the detected results had sent from the first electronic device 10. The control unit 28 displays the received data form the second electronic device 30, i.e. the groove depth of the tread, on the display unit 27 together with the tire inner pressure and the tire inner temperature, and also stores them in the memory 26 with associating them with the identification information. In this manner, the tire checking device 20 displays and stores groove depth data detected by the other measuring device and tire information such as a tire inner pressure and so on sent from the first electronic device 10 provided within the tire with associating them each other.

In the present embodiment, the tire checking device 20 is a portable size for a checker. Therefore, it can be carried easily, so that tire checking operation can be streamlined.

Figure 4:
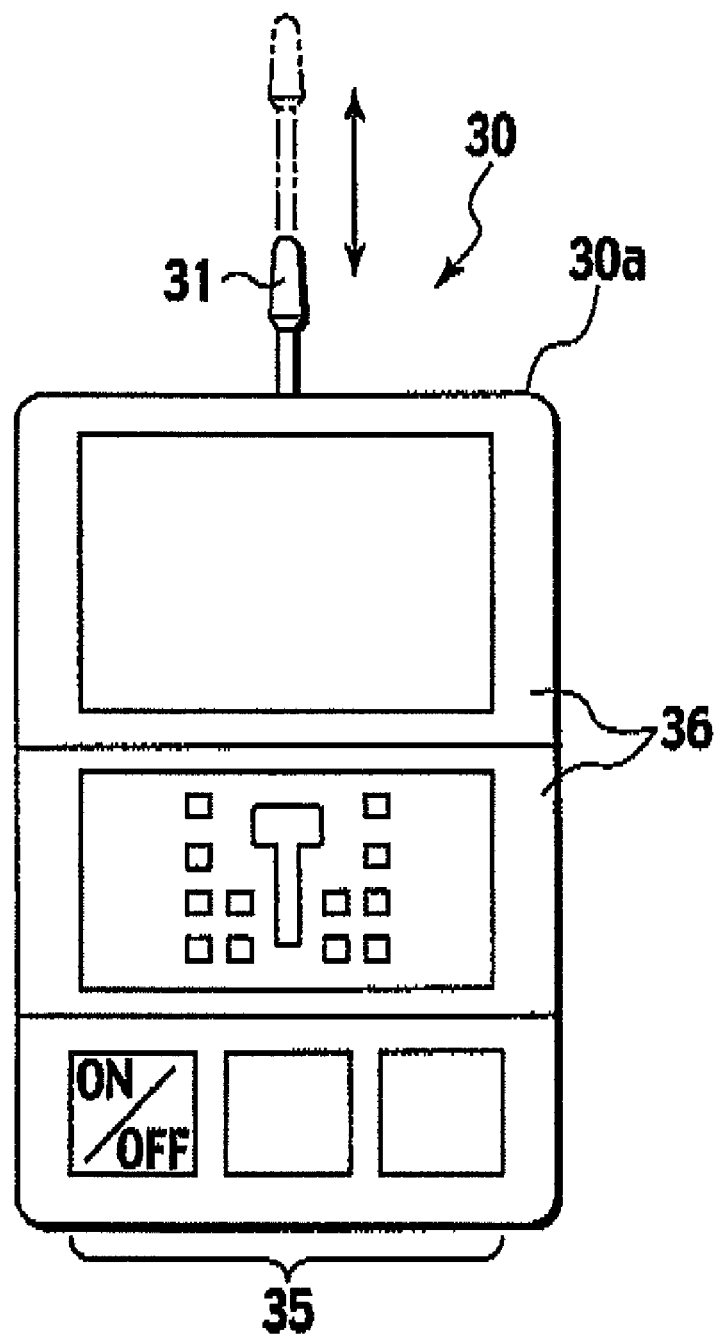
FIG. 4 is an appearance diagram illustrating an example of a second electronic device in the tire checking system.

As explained above, the second electronic device 30 is a depth meter for measuring a groove depth of the tread in the present embodiment. The depth meter includes, as shown in FIGS. 2 and 4, a groove measuring unit 31, a transmitting I/F 33 and a control unit 34. The transmitting I/F 33 transmits data with the tire checking device 20 via an antenna 32. These units are controlled collectively by the control unit 34. In addition, the second electronic device 30 further includes an operation unit 35, a display unit 36, a memory 37 and so on. Operations such as powering on/off, confirming measured results and so on are made on the operation unit 35. The display unit 36 displays measured results. The memory 37 temporally stores the measured results. According to the depth meter having such configurations, groove depth data can be sent to the tire checking device 20 in response to a request from the tire checking device 20.

Specifically, the groove measuring unit 31 is configured so as to be retractable along a longitudinal direction of a devise casing, as shown in FIG .4. A groove depth can be measured based on an extended amount of the groove measuring unit 31 after the groove measuring unit 31 has been extended under a device upper plane 30a being contacted with a tire surface. The measured results are sent to the tire checking device 20 via the antenna 32 and the transmitting I/F 33 in response to the request from the tire checking device I. Note that measuring method of the depth meter as the second electronic device 30 is not limited to the above-described method. The measuring method may be a contact-measuring method with another measuring mechanism or a contactless-measuring method with laser reflection or the like.

Note that, although the second electronic device 30 is a depth meter in the present embodiment, it is not limited if it is a measuring device associated with a tire. For example, the second electronic device 30 may be a device for measuring uneven distribution of an abrasion (an uneven-abrasion), a device for measuring rubber degrading or the like.

In the tire checking system 1 having the above-described configuration with the first electronic device 10, the tire checking device 20 and the second electronic device (depth meter) 30, the tire checking device 20 sends the sending request for the identification information and the detected results by the sensors to the first electronic device 10 via the transmitting I/F 22 when it has been detected that the acquiring switch 23a of the operation input unit 23 has been pressed. The first electronic device 10 sends, upon receiving the sending request, the tire inner pressure and the inner temperature detected by the pressure sensor 11 and the temperature sensor 12 and the identification in formation of the first electronic device 10 stored in the memory 13 to the tire checking device 20. Next, the tire checking device 20 sends, upon receiving the measured results sent form the first electronic device 10, the sending request for the groove depth to the depth meter 30. The depth meter 30 sends the groove depth data to the tire checking device 20 in response to the request from the tire checking device 20. The control unit 28 of the tire checking device 20 receives the groove depth of the tread from the depth meter and displays the groove depth on the display unit 27 together with the tire inner pressure and the tire inner temperature. In addition, the control unit 28 stores such information in memory 26 with associating it with the identification information.

Subsequently, processes executed by the tire checking system 1 in the present embodiment, such as collecting, displaying and storing of tire information, will be explained. The control unit 28 of the tire checking device 20 has configurations shown in FIG. 5 to execute a series of the above processes.

Specifically, the control unit 28 includes the operation input unit 23, an input detecting functional unit 281, an information sending requesting functional unit 282, an information storing controlling functional unit 283, a data sending requesting functional unit 284, a data storing controlling functional unit 285 and a data displaying controlling functional unit 286. The operation input unit 23 is operated by a checker. The input detecting functional unit 281 is detects especially an input into the acquiring switch 23a. The information sending requesting functional unit 282 requests the first electronic device 10 for tire information including a tire inner pressure, a tire inner temperature and identification information when an input into the operation input unit 23 has been detected by the input detecting functional unit 281. The information storing controlling functional unit 283 stores the received tire information from the first electronic device 10 in the memory 26. The data sending requesting functional unit 284 requests the second electronic device (depth meter) 30 to send groove depth data as detected results. The data storing controlling functional unit 285 stores the received groove depth data from the depth meter in the memory with associating it with the above-mentioned tire information. The data displaying controlling functional unit 286 extracts the tire information and the groove depth stored with being associated with each other from the memory to supply them to the display unit 27.

Next, processes executed by the control unit 28 with the above-described configuration, such as collecting, displaying and storing of tire information, and working of the overall tire checking system 1 will be explained specifically with reference to FIGS. 6 to 8.

First, the first electronic device 10 and the second electronic device (depth meter) 30 are measuring information associated with a tire independently from the tire checking device 20, respectively. In other words, the first electronic device 10 executes processes shown in FIG. 6, for example. If receiving a sending request from the tire checking device 20 in step S1, the first electronic device 10 detecting a pressure by the pressure sensor 11 and a temperature by the temperature sensor 12 in step S2, and then sends a tire inner pressure, a tire temperature and identification information in step S3. If no sending request, it waits. Alternatively, while each of the sensors of the first electronic device 10 continue to detect a tire inner pressure, a tire inner temperature and so on at predetermined intervals, latest data may be sent upon receiving a sending request.

In addition, the second electronic device (depth meter) 30 executes processes shown in FIG. 7, for example. The groove depth detected in step S10 is displayed on the display unit 36 in step S11. In addition, it is temporally stored in S the memory 37 in step S12. Subsequently, if receiving a data sending request from the tire checking device 20 in step S13 (step S13: yes), the groove depth data temporally stored in the memory 37 is sent to the tire checking device 20 in step S14.

As mentioned above, the tire information measured by the first electronic device 10 and the second electronic device 30 is collected by the tire checking device 20 and then stored with being associated with each tire. Processes and timings in collecting, displaying and storing of the tire information executed by the tire checking device 20 are shown in FIG. 8.

If an input into the acquiring switch 23a has been detected in step S20 (step S20: yes), the control unit 28 of the tire checking device 20 requests the first electronic device 10 for the tire information such as the tire inner pressure, the tire inner temperature and the identification information in step S21. Next, the control unit 28 receives the tire information including the tire inner pressure, the tire inner temperature and the identification information sent from the first electronic device 10 and then stores the received tire information in the memory 26 in step S14.

In addition, upon receiving the tire information from the first electronic device 10, the control unit 28 requests the depth meter as the second electronic device 30 to send the groove depth data as the detected results in step S23, For example, this step may be done by a checker's direct sending request input via an operational button such as a "data transfer button".

The control unit 28 receives the groove depth data sent from the second electronic device 30 in step S24. The control unit 28 stores the received groove depth data in the memory 26 with associating it with the identification information acquired in step S22.

The tire information and the groove depth data which have been stored with being associated each other are extracted to be supplied to the display unit 27 in following step S25.

According to the processes explained above, when a checker press the acquiring switch 23a under the tire checking device 20 being made closer to a tire as a measured object, the identification information for identifying the tire, a tire inner pressure and a tire inner temperature are send from the first electronic device 10 equipped within the tire to the tire checking device 20 and then the detected results are displayed on the display unit 27. Then, groove depth data of the tire measured by the checker using the depth meter is sent to the tire checking device 20. The tire checking device 20 receives information needed for managing the tire such as the tire inner pressure and the tire inner temperature (referred as management information) from the first electronic device 10 and the second electronic device 30 and then stores the management information in the memory 26 with associating it with each tire. The management information stored in the memory 26 is extracted by the control unit 28 if required and then displayed on the display unit 27.

In this manner, according to the tire checking system 1, a tire inner pressure and a tire inner temperature automatically detected by the first electronic device 10 and groove depth data measured by the depth meter capable of transmitting with the tire checking device 20 can be displayed and stored with being associated with each other. Therefore, since omitted can be cumbersome operations that a checker inputs manually management information including a tire inner pressure, a tire inner temperature and a groove depth, an input error can be prevented and cumbersome input operations and required time for inputting can be reduced drastically. In addition, various kinds of measured data associated with a tire can be collected and managed collectively by the tire checking device 20.

Figure 5:
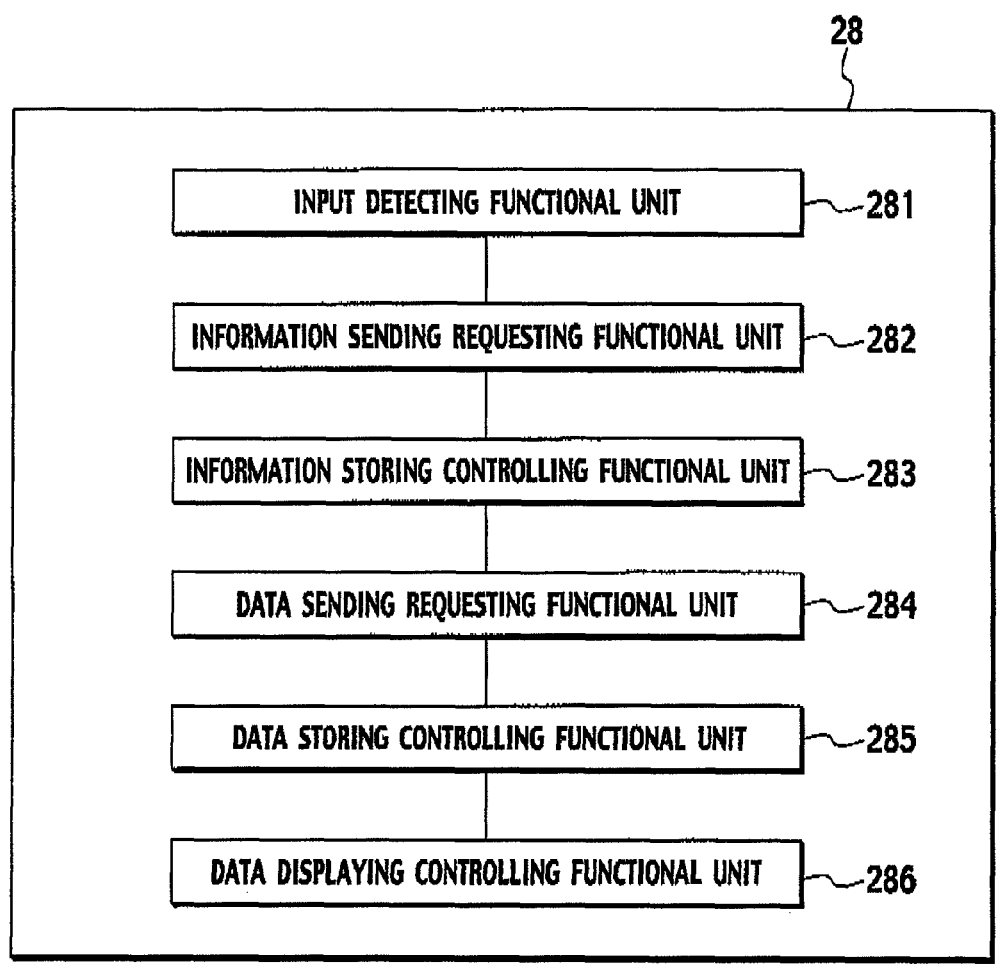
FIG. 5 is a functional configuration diagram illustrating functions of a controller of the tire checking device in the tire checking system.

Note that the configuration of the control unit 28 shown in FIG. 5 can be generally achieved by software modules. The configuration of the control unit 28 shown in FIG. 5 can be achieved by executing each of the software modules based on programs (programs executing a series of the processes shown in FIG. 6) stored in a main memory or an external storage (or an auxiliary memory) provided in the control unit 28 or the like on a general multitasking OS having functions such as a device control, a multitasking environment and a timer.

Subsequently, data examples stored in the memory 26 of the tire checking device 20 will be explained. The memory 26 stores identification information for identifying a tire, a tire inner pressure, a tire inner temperature and a groove depth as a table. FIG. 9(a) shows management information, which is acquired from the first electronic device 10 and the second electronic device 30 in response to a sending request in steps S21 and S23 and stored in the memory 26 in step S25. In addition, FIG. 9(b) shows a table, in which management information and identification information, which are acquired by repeating processes shown in FIG. 8 executed by the tire checking device 20, are associated with each other. As shown in FIG. 9(b), position information indicating equipped position can be input additionally in respect to each tire capable of having been specified by the identification information for a checker in order to recognize easily.

In addition, in the present embodiment, vehicle identification information is stored with being associated with, as shown in FIG. 9(c). Here, the vehicle identification information is information capable of specifying a vehicle such as a serial number of the vehicle, a license plate number and a VIN. In addition, a color of the vehicle, a model name, a distinction and so on can be input. The vehicle identification information can be input by a checker before or after checking. In this manner, in case where the vehicle identification information identifying a vehicle is associated in addition to the identification information, a checker can recognize measured tires and an input error and so on can be prevented. The measured results can be displayed on the display unit 27 in a list with a table form shown in FIG. 9(b) or 9(c).

Figure 10:
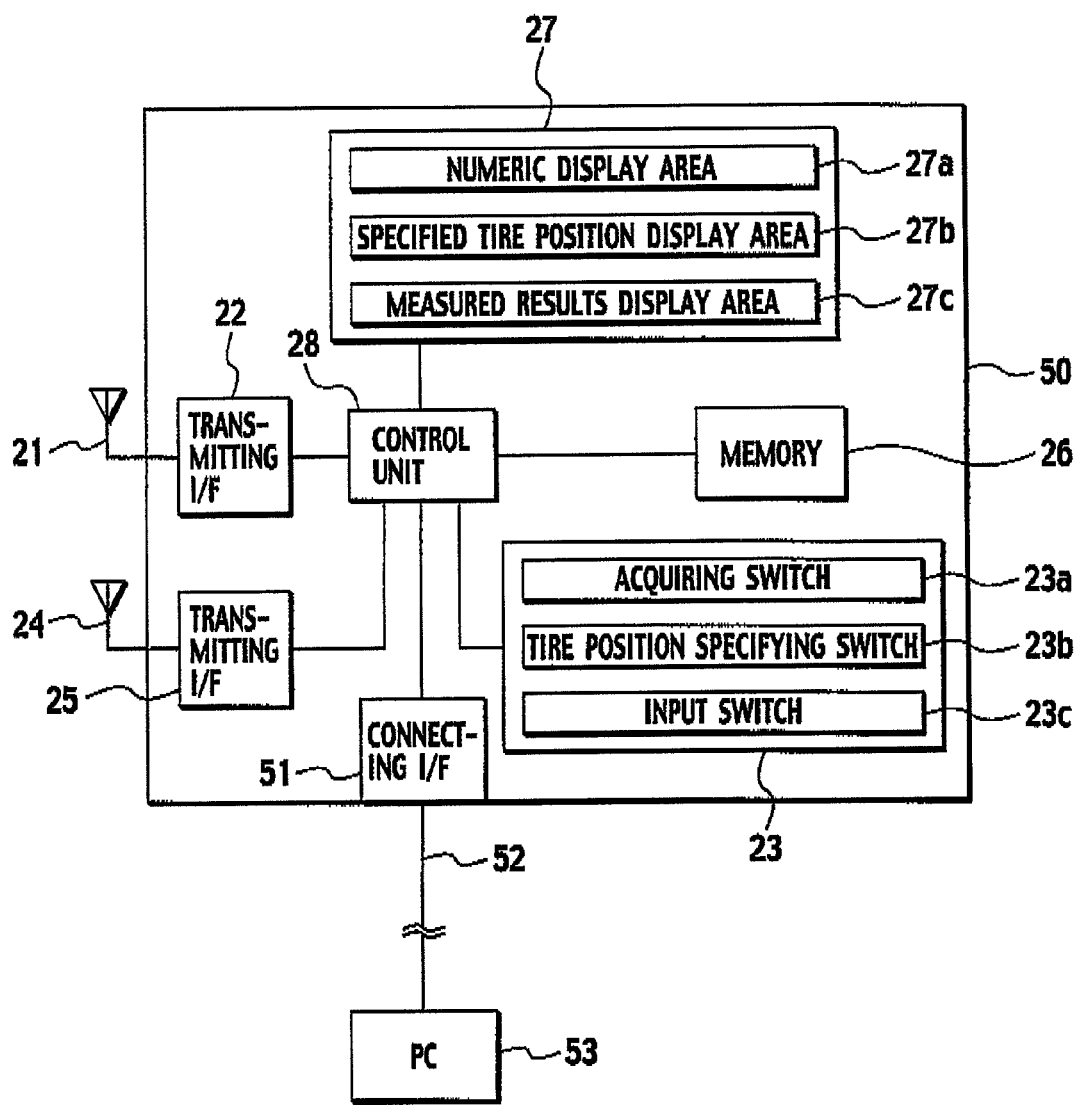
FIG. 10 is a configuration diagram illustrating a tire checking device in a tire checking system of another embodiment according to the present invention.

The management information collected by the tire checking device 20 and collectively stored in the memory 26 can be further managed with a third electronic device (information processing device) such as a personal computer (hereinafter, referred as PC). FIG. 10 shows a tire checking device 50 that can transmits the management information such as a tire inner pressure, a tire inner temperature, identification information and a groove depth to an external device. In the tire checking device 50, each element having a similar function as that in the tire checking device 20 shown in FIG. 2 is allocated with an identical numeral and its detailed explanation is omitted.

The tire checking device 50 includes a connecting interface (I/F) 51 for connecting to the third electronic device. The tire checking device 50 can connect to a PC 53 as the third electronic device via a connecting cable 52. Components pursuant to a known general-purpose communication system can be applied as the connecting I/F 51 and the connecting cable 52. In this manner, since management information such as a tire inner pressure, a tire inner temperature, identification information and a groove depth data can be transmitted to the PC 53 by the connecting I/F 51, the management information can be managed by the PC 53.

Note that the connecting I/f 51 may be a communication unit with a wireless connecting system such as wireless LAN, Bluetooth (registered trademark) and so on. In addition, it may adopt an identical communication system as that between the second electronic device 30 and the transmitting I/F 25 to be shared as a data transmission system with the PC 53.

As explained above, according to the tire checking system 1 shown as one embodiment of the present invention, a measurement of a tire inner pressure can be automated by receiving tire information from the first electronic device 10. In addition to this, since other management information can be received from the second electronic device 30 conducting another measurement in respect to a tire, cumbersome operations such as inputs of measured results by a checker can be omitted. Therefore, occurrence of an input error or the like can be prevented. Furthermore, required time for tire checking can be reduced drastically. In addition, according to the tire checking system 1, since management information can be managed with respect to each vehicle, each equipped position or each tire, a tire-replacement timing or the like can be provided according to an air-filling timing or a groove depth. Furthermore, in case where the tire checking system 1 can connect to the PC 53 or the like, it can collectively manage information on a vehicle and tires equipped on the vehicle with an information processing device such as the PC 53. In case where a PC with a high processing capacity is connected, a large amount of management information can be accumulated, and further a warning for a air-filling timing, a tire-replacement timing or the like in respect to any of tires equipped on a specific vehicle can be provided to a checker.

Note that a scope of the right included in the present invention is defined only by a pertinent claimed subject matter of the present invention based on the above descriptions and is not limited to these embodiments. In addition, the present invention can take various modifications within a scope without deviancy from substance of the invention.

Industrial Applicability

According to the present invention, cumbersome operations for checking tire conditions including a tire inner pressure and a groove depth can be eliminated and information indicating conditions in respect to each tire can be easily managed.

The invention claimed is:

1. A tire checking device comprising:
   a first transmitting unit for receiving tire information including a tire inner pressure of a pneumatic tire and identification information for identifying the pneumatic tire from a first electronic device provided within the tire and sending a requesting signal for the tire information to the first electronic device;
   an operation input unit onto which an operator conducts an input operation;

an input detecting unit for detecting an input onto the operation input unit;

a sending requesting unit for requesting the first electronic device for the tire information when the input operation has been detected by the input detecting unit;

a second transmitting unit for receiving data from a second electronic device and sending data to the second electronic device;

a data requesting unit for requesting the second electronic device for data;

a display unit for displaying the tire information-and the data; and a control unit for requesting the second electronic device for data by controlling the data requesting unit when having received at least the identification information from the first electronic device via the first transmitting unit to display the tire information and the data which have been received and associated with each other on the display unit, wherein the second electronic device is a groove measuring device having a measuring unit for measuring a groove depth on a tread of the tire, and the control unit requests the groove measuring device for groove depth data by controlling the data requesting unit when having received at least the identification information from the first electronic device via the first transmitting unit to display the tire information and the groove depth data which have been received and associated with each other on the display unit.

2. The tire checking device according to claim 1, further comprising:

a storing unit for storing the tire information and the data, wherein the control unit stores the tire information and the data which have been received and associated with each other in the storing unit.

3. The tire checking device according to claim 2, wherein the storing unit stores vehicle identification information for identifying a vehicle on which the tire is equipped, and the control unit displays the vehicle identification information, the tire information and the data which are associated with each other on the display unit and stores in the storing unit.

4. The tire checking device according to claim 1, further comprising:

a transmitting unit for sending the tire information and the data which are associated with each other to a third electronic device.

5. The tire checking device according to claim 1, having a portable size.

6. A tire checking system comprising:

a first electronic device provided within a pneumatic tire;

a tire checking device for collecting and displaying checked results; and a second electronic device, wherein the first electronic device includes an inner pressure sensor for detecting a tire inner pressure of the pneumatic tire, and a transmitting device for sending tire information including the tire inner pressure and identification information for identifying the pneumatic tire, and the tire checking device includes a first transmitting unit for receiving the tire information from the transmitting device of the first electronic device and sending a requesting signal for the tire information to the first electronic device, an operation input unit onto which an operator conducts an input operation, an input detecting unit for detecting an input onto the operation input unit, a sending requesting unit for requesting the first electronic device for the tire information when the input operation has been detected by the input detecting unit;

a second transmitting unit for receiving data from the second electronic device and sending data to the second electronic device, a data requesting unit for requesting the second electronic device for data, a display unit for displaying the tire information and the data, and a control unit for requesting the second electronic device for data by controlling the data requesting unit when having received at least the identification information from the first electronic device via the first transmitting unit to display the tire information and the data which have been received and associated with each other on the display unit.

7. The tire checking system according to claim 6, wherein the second electronic device is a groove measuring device having a measuring unit for measuring a groove depth on a tread of the tire, and the control unit requests the groove measuring device for groove depth data by controlling the data requesting unit when having received at least the identification information from the first electronic device via the first transmitting unit to display the tire information and the groove depth data which have been received and associated with each other on the display unit.

8. The tire checking system according to claim 6, wherein the tire checking device further includes a storing unit for storing the tire information and the data, and the control unit of the tire checking device stores the tire information and the data which have been received and associated with each other in the storing unit.

9. The tire checking system according to claim 8, wherein the storing unit stores vehicle identification information for identifying a vehicle on which the tire is equipped, and the control unit displays the vehicle identification information, the tire information and the data which are associated with each other on the display unit and stores in the storing unit.

10. The tire checking system according to claim 6, wherein the tire checking device further includes a transmitting unit for sending the tire information and the data which are associated with each other to a third electronic device.

11. A tire checking method for checking a pneumatic tire using information transmitting system which includes a first electronic device provided within the pneumatic tire, a second electronic device and a device for collecting data sent from the first electronic device and the second electronic device, comprising:

a step of receiving an input operation from an operator;

an input detecting step of detecting the input operation;

an information sending requesting step of requesting a sending device to send tire information, the sending device sending the tire information including a tire inner pressure and identification information for identifying a tire when an input operation has been detected in the input detecting step;

a first receiving step of receiving the tire information sent from the sending device;

a data requesting step of requesting a second electronic device to send data when at least the identification data has been received in the first receiving step;

a second receiving step of receiving the data sent from the second electronic device; and a displaying step of displaying the tire information and the data which have been associated with each other on a display unit, the method further comprising:

a measuring step of measuring a groove depth on a tread of the tire by the second electronic device, wherein the groove depth measured in the measuring step is requested as the data in the data requesting step when at least the identification data has been received in the first receiving step, the measured groove data is received as the data in the second receiving step, and the tire information and the groove depth which have been associated with each other are displayed on the display unit in the displaying step.

12. The tire checking method according to claim 11, further comprising:

a storing step of storing the tire information and the data in a memory, wherein the tire information and the data which have been received and associated with each other are stored in the memory in the storing step.

13. The tire checking method according to claim 11, further comprising:

a sending step of sending the tire information and the data which have been received to a third electronic device.

* * * * *